United States Patent
Palella et al.

(10) Patent No.: US 12,442,637 B2
(45) Date of Patent: Oct. 14, 2025

(54) METHOD FOR PROVIDING A NAVIGATION INFORMATION, CORRESPONDING SYSTEM AND PROGRAM PRODUCT

(71) Applicant: STMicroelectronics S.r.l., Agrate Brianza (IT)

(72) Inventors: Nicola Matteo Palella, Rivolta d'adda (IT); Leonardo Colombo, Lecco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 231 days.

(21) Appl. No.: 17/128,744

(22) Filed: Dec. 21, 2020

(65) Prior Publication Data

US 2021/0190499 A1   Jun. 24, 2021

(30) Foreign Application Priority Data

Dec. 23, 2019   (IT) .................. 102019000025399

(51) Int. Cl.
| | | |
|---|---|---|
| *G01C 21/16* | (2006.01) | |
| *G01C 5/06* | (2006.01) | |
| *G01C 25/00* | (2006.01) | |
| *G01S 19/47* | (2010.01) | |

(52) U.S. Cl.
CPC ............. *G01C 21/165* (2013.01); *G01C 5/06* (2013.01); *G01C 25/00* (2013.01); *G01S 19/47* (2013.01)

(58) Field of Classification Search
CPC ........ G01C 21/165; G01C 5/06; G01C 25/00; G01S 19/47
See application file for complete search history.

(56) References Cited

U.S. PATENT DOCUMENTS

| | | | |
|---|---|---|---|
| 6,205,400 B1 | 3/2001 | Lin | |
| 6,298,287 B1 | 10/2001 | Tazartes et al. | |
| 6,522,298 B1 * | 2/2003 | Burgett ................ | G01C 5/06 |
| | | | 342/462 |
| 6,735,542 B1 * | 5/2004 | Burgett ................ | G01C 5/06 |
| | | | 701/4 |

(Continued)

FOREIGN PATENT DOCUMENTS

| | | | |
|---|---|---|---|
| CN | 101975578 A | * | 2/2011 |
| CN | 102401658 A | | 4/2012 |

(Continued)

OTHER PUBLICATIONS

Stanley, A., J., "Kalman filter mechanization for the baro-inertial vertical channel," Proceedings of the Annual Meeting on Navigation and Exploration, Jan. 1, 1991, pp. 153-159, XP001035080.

*Primary Examiner* — Hyun D Park
(74) *Attorney, Agent, or Firm* — Slater Matsil, LLP

(57) ABSTRACT

A method for providing navigation information by a navigation sensing device including an absolute positioning source providing three-dimensional absolute position data including an absolute altitude value, an Inertial Measurement Unit providing inertial data, in particular accelerations and angular rates, and a barometer sensor providing a pressure measurement. The method includes processing the inertial data and the absolute position data to obtain two-dimensional position information, in particular longitude and latitude, and processing the pressure measurement and the absolute position data to obtain an altitude estimate.

20 Claims, 4 Drawing Sheets

(56) References Cited

U.S. PATENT DOCUMENTS

| | | | |
|---|---|---|---|
| 6,970,795 B1 | 11/2005 | Burgett et al. | |
| 8,395,542 B2 | 3/2013 | Scherzinger et al. | |
| 8,566,034 B1 | 10/2013 | Van Wyek Loomis | |
| 9,429,656 B2 | 8/2016 | Garin | |
| 10,782,418 B1 * | 9/2020 | Wang | G01S 5/16 |
| 2004/0186635 A1 | 9/2004 | Manfred | |
| 2005/0040280 A1 * | 2/2005 | Hua | G05D 1/107 701/3 |
| 2009/0043504 A1 * | 2/2009 | Bandyopadhyay | G01C 17/38 701/469 |
| 2010/0274444 A1 * | 10/2010 | Williamson | B64D 39/00 701/29.8 |
| 2013/0204567 A1 * | 8/2013 | Nieminen | G01C 5/00 702/94 |
| 2015/0153171 A1 * | 6/2015 | Zhou | G01C 5/06 702/138 |
| 2016/0202359 A1 | 7/2016 | Kana et al. | |
| 2017/0356744 A1 * | 12/2017 | Klipp | G01C 21/206 |
| 2018/0356492 A1 * | 12/2018 | Hamilton | G01S 5/0242 |
| 2019/0179031 A1 | 6/2019 | Broumandan et al. | |

FOREIGN PATENT DOCUMENTS

| | | |
|---|---|---|
| CN | 105807303 A | 7/2016 |
| TW | 554174 B | 9/2003 |

\* cited by examiner

METHOD FOR PROVIDING A NAVIGATION INFORMATION, CORRESPONDING SYSTEM AND PROGRAM PRODUCT

CROSS-REFERENCE TO RELATED APPLICATIONS

This application claims the benefit of Italian Application No. 102019000025399, filed on Dec. 23, 2019, which application is hereby incorporated herein by reference.

TECHNICAL FIELD

The description relates to the field of navigation, and in particular to the capability of a device to determine a user position, velocity and altitude.

BACKGROUND

A currently leading technology for positioning applications in the automotive market is GNSS, with conventionally-used navigation systems including navigation and telematics. Soon, emerging applications such as autonomous driving, car to car (and to infrastructure) communication may provide for further technological challenges.

A GNSS receiver provides an absolute position reference, while possibly exhibiting one or more drawbacks, e.g., it relies on a satellite signal, which may be unavailable (e.g., indoors, tunnels) or corrupted (e.g., urban environments, reflections, and/or multipath).

In order to overcome these limitations, a solution may involve merging GNSS technology with other sensing technologies, to generate a redundant system wherein a component is able to overcome the disadvantages of one or other type of components.

Examples of technologies complementary to GNSS include inertial sensors, e.g., inertial measurement units, (3 axes) gyroscopes, (3 axes) accelerometers, odometers, compasses, barometers, cameras, light detection and ranging (LiDAR), precise maps and radars.

It is known a dead reckoning unplugged (not dependent on vehicle data) technology combining inertial sensors together with GNSS, providing seamless fusion of satellite measurements, angular rate and acceleration data. Such technology is designed to provide automotive users with improved accuracy, availability and integrity of positioning data, in environments where GNSS is absent or corrupted.

As opposed as traditional Dead Reckoning, such technology does not require electrical connection to a vehicle speed signal; hence it is an autonomous technology giving leading positioning performance with the advantage of an extremely simple device installation. Such technology is suitable for any road vehicle application requiring reliable positioning data without having the necessity to access vehicle odometer or speed data.

A sensor using dead reckoning unplugged mode may integrate GNSS with an inertial measurement unit (IMU) with the target to estimate user 2D (horizontal) position in terms of latitude and longitude. However, in case of signal loss, an altitude estimate provided by IMU will not be accurate, due to the superimposition of errors related to speed and altitude. To extend the sensor capabilities to a third dimension, i.e., altitude, automotive industry customers are required to integrate in the system a barometer sensor, able—if properly calibrated—to provide an absolute estimation of altitude on the basis of a reliable reference value.

In several applications and user cases (automotive, consumer) it is required to use a motion and position sensor (MPS), i.e., an electronic device composed by a Global Navigation Satellite System (GNSS) receiver, an inertial measurement unit (IMU), a barometer and a processor to process the GNSS and sensor data.

In this context the GNSS provides accurate position information that processor deploys to an external user application; the IMU and barometer supply information when GNSS is either unavailable or degraded.

Typically, the IMU provides horizontal position in terms of latitude and longitude, while the barometer is used to derive altitude.

If properly calibrated, atmospheric pressure output supplied by the barometer can be converted into an absolute altitude in meters above sea level.

However, barometer calibration is problematic.

It is known in the state of art how to perform barometer calibration with a dedicated procedure in the unit production line. This, however, involves the introduction of a dedicated testing procedure and machinery, implying a not-negligible increase in production costs.

Another known technique is to require the user to recalibrate manually the barometer entering in the GUI (graphic user interface) of the final product the altitude of its current location (e.g., derived by a map).

However, this requires the user to know precisely the altitude of its current location, which it is not always available, in particular in automotive applications, and also it requires user action and it is not automatic. In general this approach is quite commonly used by fitness/hiking applications, while not being applicable to the automotive case.

SUMMARY

The need therefore is felt to overcome the disadvantages previously discussed. According to one or more embodiments, such an object may be achieved by means of a method having the features set forth in the claims that follow.

One or more embodiments may refer to techniques for providing a navigation information, in particular in a land vehicle, including position and altitude information by a navigation device including operation by a dead reckoning procedure including an absolute positioning source, e.g., GNSS receiver, providing three-dimensional position data including an absolute altitude, an Inertial Measurement Unit (IMU) providing motion data including in particular accelerations and angular rates, and a barometer sensor providing a pressure measurement. The method includes processing the motion data and the position data to obtain two-dimensional position information, in particular longitude and latitude, and processing the pressure measurement and the position data including an absolute altitude to obtain altitude information.

One or more embodiments may relate to absolute positioning sources such as GNSS—Global Navigation Satellite System, Wi-Fi, or other ranging techniques.

One or more embodiments may relate to inertial navigation systems in automotive applications, i.e., to four (or possibly more) wheeled vehicles. Such systems may include Dead Reckoning (DR) systems.

Embodiments moreover concerns a related navigation system configured to provide a navigation information as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instruction for controlling a computer system to coordinate the performance of the method. Reference to "at least one computer" is evidently intended to highlight the possibility for the present disclosure to be implemented in a distributed/modular fashion.

The claims are an integral portion of the disclosure of the invention as provided herein.

As mentioned in the foregoing, the present disclosure provides solutions regarding a method for providing a navigation information, in particular in a land vehicle, including position and altitude information by a navigation device including operation by a dead reckoning procedure including an absolute positioning source, e.g., GNSS receiver, providing three-dimensional position data including an absolute altitude, an Inertial Measurement Unit (IMU) providing motion data including in particular accelerations and angular rates, and a barometer sensor providing a pressure measurement. The method includes processing, by a data fusion process, the inertial data and the absolute position data to obtain two-dimensional position information, in particular longitude and latitude, and processing, by a data fusion process, the pressure measurement and the absolute position data to obtain an altitude estimate. The processing the pressure measurement and the absolute position data to obtain an altitude estimate, includes performing a recursive estimation operation, in particular a Kalman filtering, to obtain the altitude estimate including recursively estimating a state vector including state variables representing calibration parameters, the recursive estimation operation comprising at each iteration performing a system update operation including updating a state transition model estimating the altitude estimate using as external input the pressure measurement measured by the barometer and a current estimate of the calibration parameters, and checking if an absolute altitude measurement is available from the absolute positioning source and in the affirmative case performing a measurement update operation using as input observation the absolute altitude, first performing calculation of a difference between the altitude estimate provided by the system update operation and the absolute altitude, then performing the measurement update operation updating the altitude estimate in the system update operation as a function of the difference and feeding back to the system update operation the difference to correct the altitude estimate in the system update operation and the calibration parameters.

In variant embodiments, the recursive estimation filtering includes an Extended Kalman Filter.

In variant embodiments, the state variables representing calibration parameters include a pressure referenced altitude, representing the altitude corresponding to a certain fixed atmospheric pressure value measured by the barometer, a sensitivity, representing a coefficient converting pressure to altitude and the output altitude information and the state transition model implemented in the system update stage includes a first system update equation calculating the sensitivity estimate as the sensitivity estimate at a previous iteration plus an error on sensitivity estimate introduced by the first system update equation, a second system update equation calculating the pressure referenced altitude as the pressure referenced altitude estimate at a previous iteration plus an error on pressure referenced altitude estimate introduced by the second system update equation, and a third system update equation calculating the estimated altitude as the referenced estimated altitude summed to the difference between the current pressure observation and the initialization pressure multiplied by the sensitivity plus an error on estimated altitude introduced by the third system update equation.

In variant embodiments, the method includes providing initialization values to a system update operation, including an initialization value for estimated altitude, a, a pressure referenced altitude initialization value, pressure initialization value representing the pressure at which the pressure referenced altitude estimate, or altitude bias, is referred to and a sensitivity initialization value.

In variant embodiments, the a state transition matrix of the state transition model is obtained performing the partial differentials of the state vector versus each one of the state variables ([h $h_0$ k]) and a system noise matrix as a diagonal matrix having on the diagonal the standard deviations ($\sigma_h$, $\sigma_{h_0}$, $\sigma_k$) of the errors ($v_h$, $v_{h_0}$, $v_k$) in the first, second and third system update equation respectively.

In variant embodiments, the method includes feeding back to the system update operation the difference to correct the altitude estimated in the system update operation and the calibration parameters after waiting for the next pressure measurement and then executing the next iteration of the recursive estimation filtering operation.

In variant embodiments, the first system update equation is corrected for the variation of the air density with the altitude.

In variant embodiments, the method includes storing the state variables values in correspondence of a given event, and loaded the stored values as initialization values in correspondence of an event following the given event.

The present disclosure also refers to a navigation system configured to provide a navigation information, in particular in a land vehicle, including position and altitude information by a navigation device including operation by a dead reckoning procedure including an absolute positioning source, e.g., GNSS receiver, providing three-dimensional position data including an absolute altitude, one or more inertial sensors, in particular an Inertial Measurement Unit (IMU) providing motion data including in particular accelerations and angular rates, a barometers sensor providing a pressure information, and a processor module configured to perform the method of any of the previous embodiments In variant embodiments, the processor module includes a module configured for performing data fusion comprising a module to process the inertial data and the position data to obtain two-dimensional position information, in particular longitude and latitude and a module configure to process the pressure information and the position data including an absolute altitude to obtain an altitude estimate.

In variant embodiments, the processor module includes a nonvolatile memory configured to store the state variables values in correspondence of a given event.

In variant embodiments, the absolute positioning source is a GNSS receiver.

In variant embodiments, the navigation system is a mounted on a land vehicle.

The present disclosure also refers to a computer program product loadable into the memory of at least one processing circuit and configured to execute the method of any of the previous embodiments when run in the at least one processing circuit.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
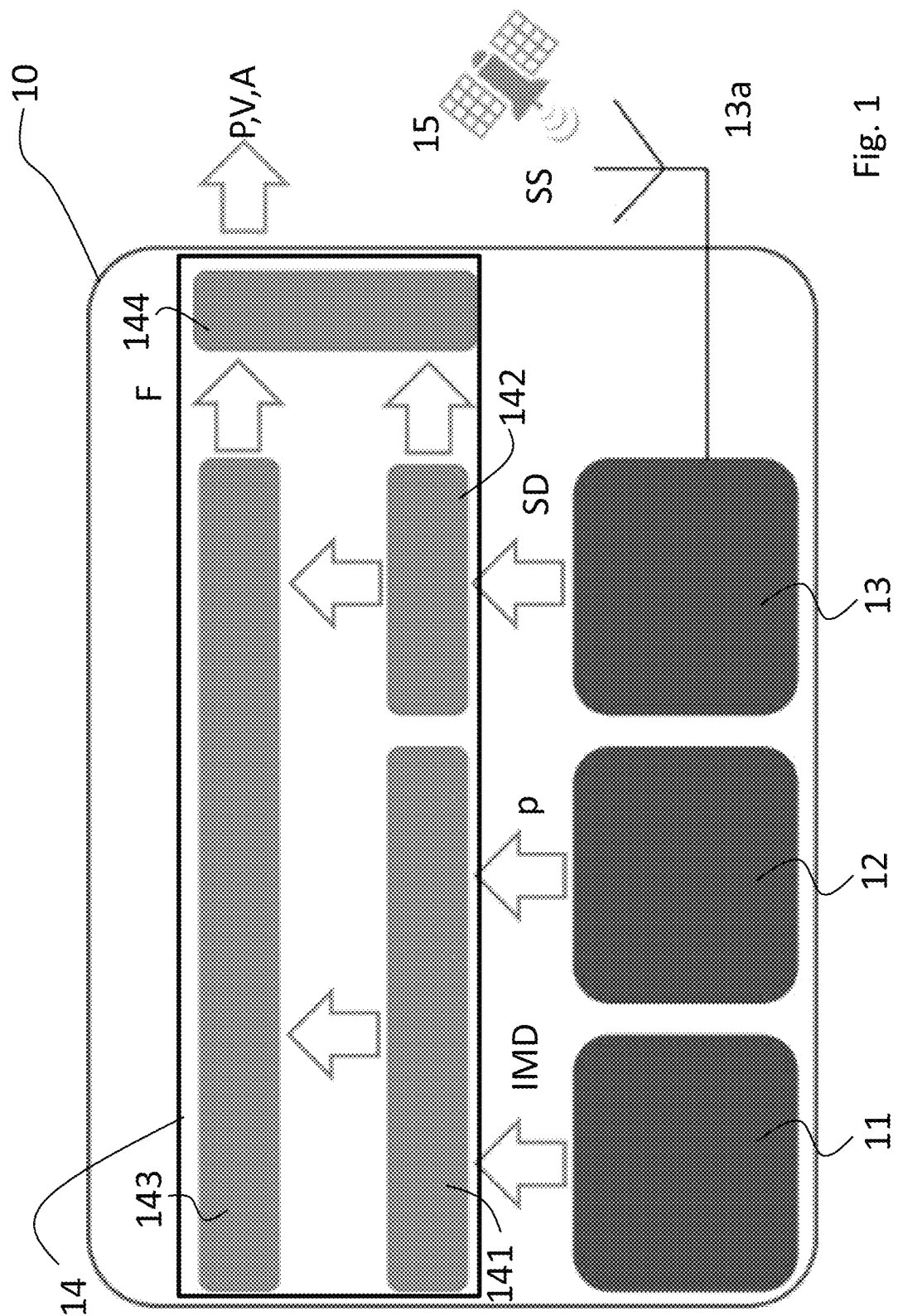
FIG. 1 is exemplary of a possible implementation of a navigation sensor according to one or more embodiments.

In FIG. 1 it is described an embodiment of a vehicle motion and position sensor 10, which is designed to be integrated on a four wheeled vehicle, aiming to measure its absolute position in terms of latitude, longitude and height, and its motion in terms of velocity and altitude.

In FIG. 1 it is shown a simplified version of the sensor 10, where the main hardware components embedded in the device comprise:

a digital six axis IMU 11, comprising a 3-axis gyroscope and a 3-axis accelerometer, supplying as output inertial measurement data IMD;

a digital barometer 12 supplying as output a barometric pressure data p;

a GNSS (Global Navigation Satellite System) hardware receiver 13, able to receive GNSS signals SS of a satellite 15 from an antenna 13a preferably comprised in the VMPS sensor 10, and process them in order to obtain measurements about its satellite distance from earth and relative motion, supplying them as satellite position data SD;

a position processor 14, running SW able to receive and process all the values IMD, p, SD provided as output by such components 11, 12, 13 and calculate a vehicle position P and motion quantities, specifically velocity V and altitude A.

The position processor 14 includes software modules running on the processor 14 comprising:

a sensor interface 141 comprising a set of drivers, e.g., I2C and/or SPI, interfacing sensor registers of the IMU 11 and barometer 12 to extract the IMD data and barometric pressure p data and format such extracted IMD data and barometric pressure p data in a format used by a fusion software module 143, as better explained here below;

a GNSS software module 142 configure to process satellite position data SD to calculate a GNSS based position and altitude estimate a fusion software module 143 configured to merge data corresponding to the values IMD, p, SD provided as output by from IMU 11, barometer 12 and GNSS 13 and processed by the sensor interface 141 and GNSS software module 142 respectively, supplying as output fused GNSS/Sensor data F a UART driver 144 able to pack fused GNSS/Sensor F data as vehicle position P, velocity V and altitude A values and provide them as output to one or more external applications.

Figure 2:
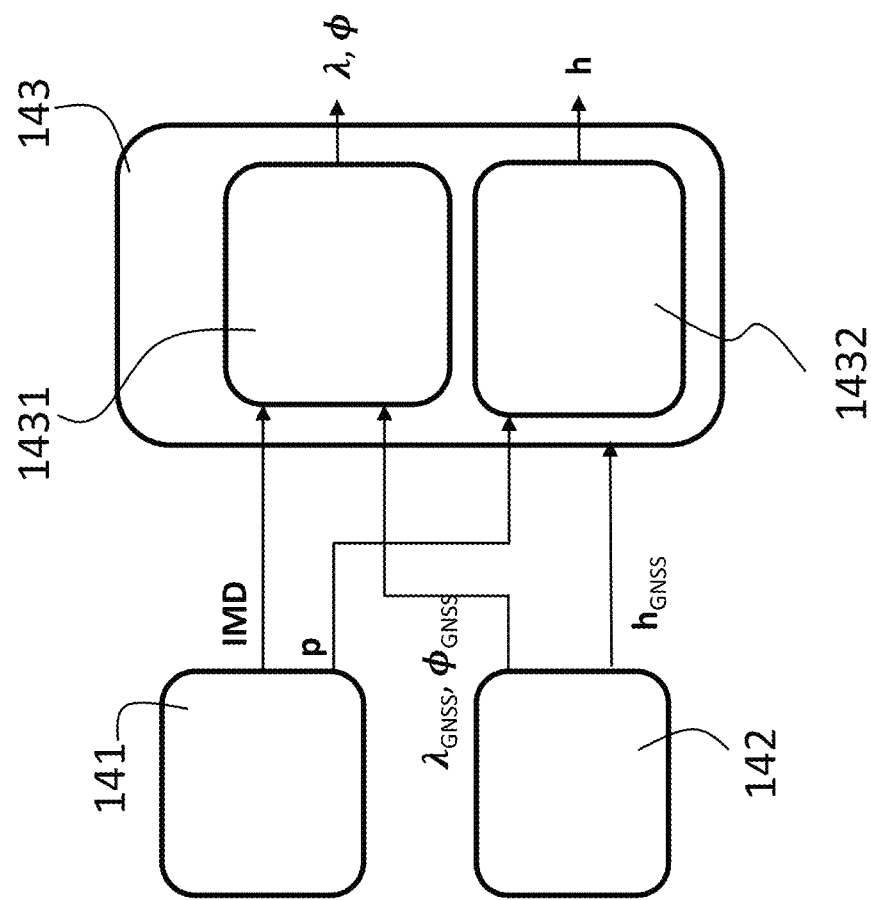
FIG. 2 is exemplary of a possible implementation of a processing module of the navigation sensor according to one or more embodiments.

In FIG. 2 it is shown a detail of the fusion software module 143, which comprises a first 2D navigation block 1431 configured to estimate user position on earth surface according to latitude $\lambda$ and longitude $\phi$. Such 2D navigation block 1431 receives as input a satellite position, expressed as satellite measured latitude $\lambda_{GNSS}$ and satellite measured longitude $\phi_{GNSS}$ in satellite data SD estimated by the GNSS software module 142 and the motion data IMD acquired by the IMU 11, i.e., inertial data, which include angular rates and accelerations over three axes sensed by the IMU11, and blend them together to provide an improved, error free position estimation. In the fusion process is relevant to perform an accurate calibration of IMU errors.

The fusion software module 143, according to the solution here described, includes also a 3D navigation block 1412 configured to estimating user altitude vs earth surface $h_r$. The 3D navigation block 1432 receives as input a satellite measured altitude $h_{GNSS}$ estimated by the GNSS software module 142 and pressure data p acquired by the barometer 12 and blends them together to provide an improved, error free altitude estimation h. In the fusion process is relevant to perform accurate calibration of barometer errors.

It is here described a method for calibration of barometer pressure which is performed in the 3D navigation block 1432 along with the procedures that need to be implemented in order to fuse GNSS altitude $h_{GNSS}$ with barometer pressure data p, aiming to calibrate properly the pressure sensor 12 and provide a continuous and accurate altitude estimate independently from GNSS signal presence and quality.

In particular the block 1432 is configured to implement a recursive estimation operation (e.g., Kalman Filter, preferably Extended Kalman Filter by taking account of the altitude value obtained by the GNSS receiver.

In an embodiment the recursive estimation operation is implemented by an Extended Kalman Filter (EKF), modeling altitude calculation and barometer calibration parameters.

Such Extended Kalman Filter is driven by the calibrated barometer measurement, and GNSS altitude $h_{GNSS}$—when the GNSS signal is good—is used to provide state observation.

The recursive estimation operation is carried out recursively by an algorithm estimating the state of the system of interest. The latter is driven by an input whose calibrated trend is corrected filtering noisy measurements.

The algorithm will be now described in general with reference to a generic state vector x, and includes two main steps.

A first step includes describing the time evolution of the state vector is described by the system model:

$$x_t = Ax_{t-1} + Bu_t + Q \qquad \text{Eq. 1}$$

where $x_t$ and $x_{t-1}$ are the system state estimates in two consecutive discrete epochs t, t−1, $u_t$ is a current external input, e.g., at the same epoch t of the system state $x_t$, A is a state transition matrix describing state evolution over time and B is an input matrix describing how input drives state over time. Since the model cannot be perfect, system noise Q represents the estimated amount of uncertainty between predicted and true state.

The system model of Eq. 1 above might not guarantee full observability for the state vector x. Hence, the aforementioned second step is necessary, defined by a measurement model:

$$y_t = Hx_t + R \qquad \text{Eq. 2}$$

Figure 3:
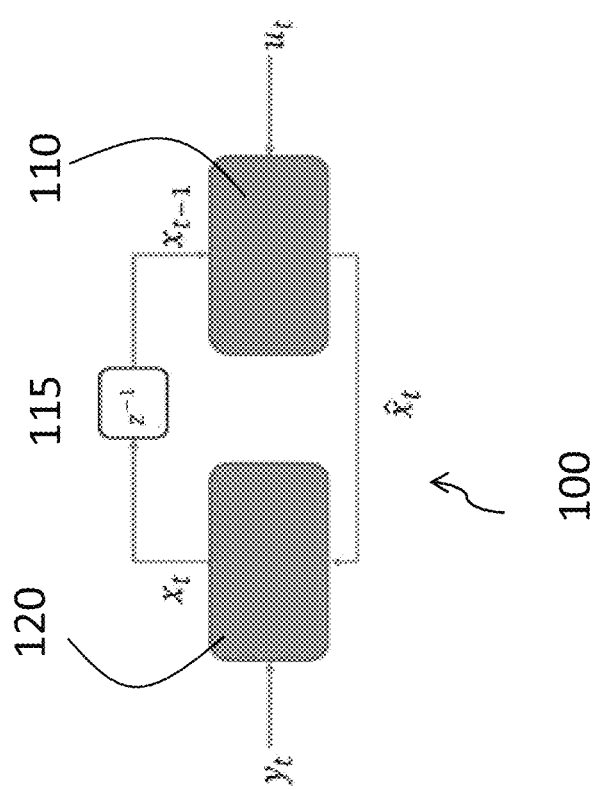
FIG. 3 is exemplary of a block schematics of a generic recursive estimation procedure according to one or more embodiments.

Such measurement model describes the relationship between the state vector $x_t$ at a certain epoch t and a set of noisy measurements $y_t$ that are used to observe it. H is referred as measurement matrix, linking the state vector $x_t$ to measurement, and R is a measurement noise, representing an estimated amount of uncertainty in the transformation. The two equations Eq. 2 and Eq. 1 above fully describe the recursive filter behavior, which is detailed in FIG. 3, which describes the recursive filter procedure or algorithm, indicated as a whole with the reference 100.

Here it is shown a block 110, representing the system update step, embodied by Eq. 1, and a block 120, representing the measurement update step, embodied by Eq. 2.

The recursive filter procedure 100 is started with the system update 110, which implements Eq. 1. A first iteration of the procedure 100 it is provided an initial guess of system state at epoch $x_{t-1}$, in particular by design or at the factory. The system model in block 11o predicts next state value, i.e., the state estimate $\hat{x}_t$, according to Eq. 1 based on previous value of the state $x_{t-1}$, at the first iteration the initial guess of system state at epoch $x_{t-1}$, and based on the current driving input $u_t$. The state estimate $\hat{x}_t$ is supplied to block 120, where Eq. 2 is used to obtain a prediction of measurements $\hat{y}_t$. In block 120 is also calculated the difference of the prediction of measurements $\hat{y}_t$ with respect to the actual ones $y_t - \hat{y}_t$, which is fed back to correct the predicted state and bound the error generated by the system model:

$$x_t = \hat{x}_t + K(y_t - \hat{y}_t) \qquad \text{Eq. 3}$$

K indicates a gain used to modulate error feedback $y_t - \hat{y}_t$ and can be calculated in different ways. One which is quite common, which is the one here described, is the Extended Kalman Filter (EKF), providing a statistical framework where not only the mean value of the state is calculated, but also its variance given the model used. In this context, the feedback Kalman gain is obtained in the measurement step 120 as:

$$K = PH^T(HPH^T + R)^{-1} \qquad \text{Eq. 4}$$

where P is a square covariance matrix associated to the state vector x. According to EKF theory, the covariance matrix P needs to be modeled for state evolution and measurements update, in a way like the one operated on state vector. This is performed through the following eq. 5 for system model prediction:

$$\hat{P}_t = AP_{t-1}A^T + Q \qquad \text{Eq. 5}$$

while the following eq. 6 models covariance correction for measurement update:

$$P_t = (I - KH)\hat{P}_t \qquad \text{Eq. 6}$$

Thus measurement update 120 includes performing Eq. 4 to compute the Kalman gain K, then performing Eq. 3 to obtain the current state estimate $x_t$, the applying Eq. 5 and Eq. 6 to obtain the current covariance matrix $P_t$.

With 115 is indicated the discrete $z^{-1}$ time operator, which is applied to the current state $x_t$ from the measurement step 120 to obtain the previous state estimate $x_{t-1}$ supplied to the system update step 110 for the next iteration.

In the solution here specifically, the system is composed by the device mounting barometer 11 and GNSS receiver 13. In the solution here described the state of such system is modeled using three variables. A first variable of the state x is the estimated altitude h, which is the output quantity of the module 1432. Then, since the instrument providing altitude is the barometer 12, its behavior is modeled through a pressure referenced altitude $h_0$, which is the altitude corresponding to a certain fixed atmospheric pressure value. Also the behavior is modeled by a further variable, sensitivity k, which represents the coefficient converting pressure, specifically in hPa to altitude, specifically in meters. Thus, summarizing, the state vector x in the method here described is represented as the vector:

$$x = [h\ h_0\ k]^T \qquad \text{Eq. 7}$$

As per eq. 1, the state estimate is driven by an external input u which in this embodiment is represented by the raw barometer 11 pressure [p] measurement:

$$u = [p] \qquad \text{Eq. 8}$$

The satellite measure altitude $h_{GNSS}$ provided by the GNSS receiver 13 (or by any other absolute source) can be used as measurement y to guarantee full observability of system state and bound estimation error by feedback control:

$$y = h_{GNSS} + v_{h_{GNSS}} \qquad \text{Eq. 9}$$

$v_{h_{GNSS}}$ is the error on altitude estimate caused by Eq (9).

In general terms this observation is believed to be—at least in good GNSS signal condition—noisy but not biased, which makes it well compatible with the theoretical guidelines for EKF, which is optimal for estimating the state in presence of noise but is unable to cope efficiently with biases.

Figure 4:
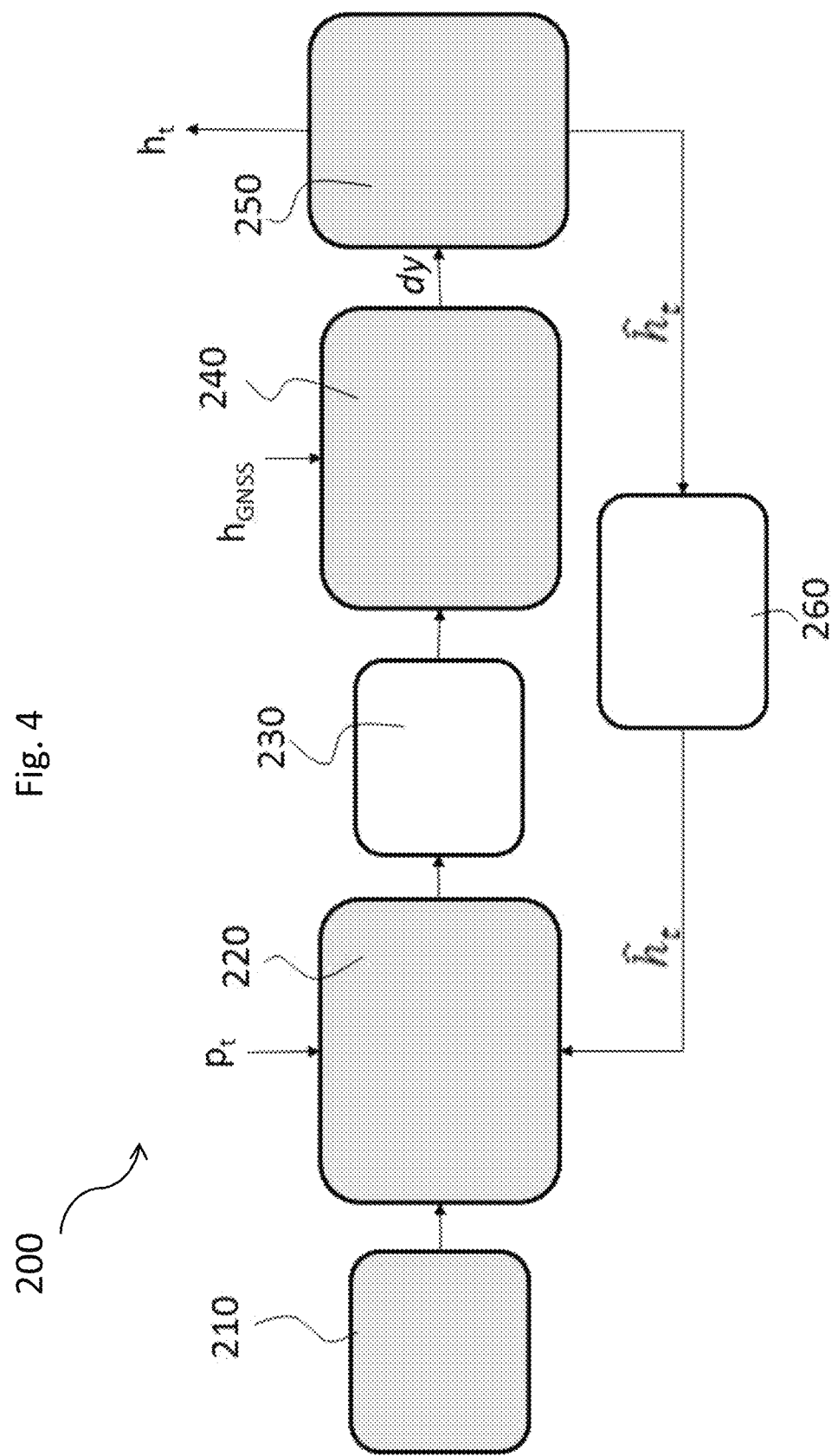
FIG. 4 is exemplary of a block schematic of a recursive estimation procedure implemented by the processing module according to one or more embodiments.

In FIG. 4 it shown a block schematic which details the procedure implemented by the 3D NAV block 1432.

In such FIG. 4 a block 210 indicates a step of providing initialization values to a system update stage 220. Such initialization values include a initialization value for estimated altitude h, a pressure initialization value po, a pressure referenced altitude $h_0$ initialization value and a sensitivity k initialization value.

The system update stage 220 receives as input such initialization values and the pressure observation or measurement $p_t$ at a current epoch t from the barometer 12. The state transition model implemented in the system update stage 220 is described in general terms by Eq. 1 and can be summarized in practice by three equations. Since the sensitivity k is constant, or, almost over long periods of time its model, as per following Eq. 10, is quite simple, but sufficient to guarantee good observability (in conjunction to other equations), the sensitivity estimate $\hat{k}_t$ is:

$$\hat{k}_t = k_{t-1} + v_k \qquad \text{Eq. 10}$$

where $v_k$ is the error on sensitivity estimate caused by Eq. 10.

The pressure referenced altitude $h_0$ is related to atmospheric condition; in fact, the same pressure value p measured by the barometer 11 can be determined by different altitude values at which the barometers 11 is placed, depending on air humidity and temperature. However, since atmospheric parameters are not available in general for the applications here considered and it is complex to take in account a full atmospheric model in any case, hence the model for the pressure referenced altitude $h_0$, i.e., the altitude corresponding to a certain given pressure value, is also kept simple:

$$\hat{h}0_t = h0_{t-1} + v_{h_0} \qquad \text{Eq. 11}$$

where $v_{h_0}$ is the error on pressure referenced altitude estimate, or altitude bias, caused by Eq. (11).

The Inventors believe, also on the basis of experimental results, that such model according eq. 11 may be enough to guarantee a reliable altitude estimate, and this can be explained mainly by two reasons. First, the atmospheric condition is slowly varying, such that the pressure referenced altitude $h_0$ values over consecutive epochs (update is carried out at 1 Hz) can be considered constant. In second place, over long periods, the pressure referenced altitude $h_0$ can anyway be observed through filtered satellite measured altitude $h_{GNSS}$ and hence its variation be tracked by the procedure 200.

To carry out this task effectively a proper modeling of system error through system noise Q is important, which can be for instance empirical, exploiting a large set of consecutive GNSS and pressure observations.

Finally, Eq. 12 is the equation used to estimate from the input pressure observation $p_t$ the estimated altitude $h_t$:

$$\hat{h}_t = h0_t + k(p_t - p_0) + v_h \qquad \text{Eq. 12}$$

$v_h$ is the error on estimated altitude caused by Eq. 12. The estimated altitude $\hat{h}_t$ at a given iteration is calculated on the basis of the difference input pressure observation $p_t$ at that iteration and the pressure initialization value, modulated by the sensitivity k at that iteration, and summed to the pressure referenced altitude $h_0$ value at that iteration. To this, as just indicated is added the error $v_h$ on estimated altitude caused by the model equation.

The previously described calibration parameters, e.g., estimates of the three variables of the state x, are used to compensate the raw barometer data for scale factor and bias. In Eq. 12, $p_0$ is the pressure at which the pressure referenced altitude estimate, or altitude bias, $h0_t$ is referred to.

Equations 10 to 12 provide update to the state vector x in stage 220. However, for the procedure 200 to work, it also needs to maintain in parallel related uncertainty estimation. This is achieved by Eq. 5, in which the state transition matrix A is obtained performing the partial differentials of the state x versus each one of the state variables $x_j$, where j=1 to n, and n, as per eq. 7 is 3, thus $x_j = [h \; h_0 \; k]$ $$A = \frac{\partial x}{\partial x_j} = \begin{bmatrix} 0 & 1 & (p_t - p_0) \\ 0 & 1 & 0 \\ 0 & 0 & 1 \end{bmatrix} \qquad \text{Eq. 13}$$

In Eq. 5 it is also reported the matrix Q, referred as system noise. It is an n×n matrix used to describe the reliability of used prediction model. In the case of interest, it is diagonal:

$$Q = \begin{bmatrix} (\sigma_h)^2 & 0 & 0 \\ 0 & (\sigma_{h_0})^2 & 0 \\ 0 & 0 & (\sigma_k)^2 \end{bmatrix} \qquad \text{Eq. 14}$$

where $\sigma_h$, $\sigma_{h_0}$, $\sigma_k$ represent the standard deviations of the errors $v_h$, $v_{h_0}$, $v_k$ in the three system update equations. The errors indeed cannot be known a priori, so a proper tuning of this parameter is derived empirically and by procedure testing.

After performing the eq. 10, 11 and finally 12, obtaining the estimated altitude $\hat{h}_t$, the procedure 200 enter a wait state 230 in which the procedure waits for the next GNSS measurement. In other words the system checks the availability of the next satellite measure altitude $h_{GNSS}$ provided by the GNSS receiver 13. Preferably, in absence of an altitude $h_{GNSS}$ measurement provided by the GNSS receiver 13 the sensor 10 uses as altitude estimate the value at the output of stage 220, which is calculated on the basis of the pressure values measured by the barometer 12. In other words, during the wait state 230, the altitude outputted by the sensor 10 is the one measured by the barometer 12, which is being calibrated accurately by the procedures described in the present embodiment. When available, the system exit the wait state 230, and such satellite measure altitude $h_{GNSS}$ provided by the GNSS receiver 13 is provided as input to a difference calculation stage 240, together with the current estimated altitude $\hat{h}_t$ from stage 220. The stage 240 is configured on calculating an actual error dy between the estimated altitude $\hat{h}_t$ calculated in stage 220 and the satellite measure altitude $h_{GNSS}$:

$$dy = \hat{h}_t - h_{GNSS} \qquad \text{Eq. 15}$$

The actual error dy, which corresponds to error feedback $y_t - \hat{y}_t$ in Eq. 3, is supplied to measurement model update stage 240 to implement to Eq. 3 and obtain the output altitude $h_t = \hat{h}_t + K(\hat{h}_t - h_{GNSS})$, and fed back to correct current state estimate. A block 250 indicates a wait state for the next pressure observation $p_t$ and the execution of a next iteration of the recursive process applying Eq. 10, 11 and 12 in stage 220. The procedure 200 is thus executed recursively until the calibration parameters, i.e., estimates of the three variables of the state x, converge to their true value. After, this the filter implementing the procedure 200 only must maintain the status-quo. The feedback is scaled using the gain K, which can be calculated as per equation (4), and depends on current estimation of covariance matrix and from the matrix H, obtained doing the partial differentials of the state x versus the single altitude measurements:

$$H = \frac{\partial x}{\partial y_j} = [1 \; 0 \; 0] \qquad \text{Eq. 16}$$

In Eq. 4 it is also present the matrix R, referred as measurement noise. Indicated with m the number of measurements entering in the filter, it is an m by m matrix used to describe the reliability of used prediction model. In the case of interest, since only one measurement is available, measurement noise R is a scalar:

$$R = (\sigma_{h_{GNSS}}) \qquad \text{Eq. 17}$$

where $\sigma_{h_{GNSS}}$ represents the standard deviation of the error $v_{h_{GNSS}}$ committed in the measurement update equation. Like in system modelling, this error is derived empirically and by procedure testing.

Similarly, to what done in the model update, also the matrix P needs to be updated according to Eq. 6, which is well known in literature. To do this, the K and H matrixes described above are re-used.

The method explained above has been tested and provides reliable results for land-based applications. In such user cases the elevation changes relatively slowly between integration epochs, and for this reason the relatively simple model used for sensitivity holds. However, for applications where altitude is changing fast (e.g., avionics) this may be not valid; error generated by Eq. 10 might be difficult to be modeled with process noise only. For such cases, Eq. 10 might be modified correcting the sensitivity value by calculating it as a function of pressure and altitude:

$$k_t = ap_0(1-bh_{t-1})^c \qquad \text{Eq. 18}$$

Models constants are defined as follows:

$$a = 3.6137 \cdot 10^{-5} \text{ [m]}; \ b = 6.8753 \cdot 10^{-6}; \ c = 4.2561$$

The procedure 200 requires that the first time the procedure is started, state variables in Eq. 7 need to be initialized with user defined values, as described with reference to stage 210. For example, good guesses for h and $h_o$ are given by the first reliable altitude given by the GNSS receiver 13. For the sensitivity k a generic value (like zero) might be needed. With filter constants properly set and availability of good GNSS signal, the filter will converge in a reasonable time to true values for each state variable. However, for the practical usage of the procedure in a product, it is not convenient to repeat the calibration procedure at each startup. So, in common embodiments, a non-volatile memory may be available in the sensor 10 where state variables values are copied in correspondence of a given event, e.g., each time a test session ends or each time the vehicle halts or the engine is switched off. Such values are reloaded in an event subsequent to the given event, as a new session starts or the vehicle is restarted, allowing the sensor 10 to provide reliable altitude at startup even in absence of GNSS signal reception, as it may happen for instance if the vehicle is started in a garage, or in case of a long time to get a valid GNSS fix (Warm Start), a condition which is common in dynamic scenarios, especially in urban areas where GNSS signal is not always reliable.

Thus, on the basis of the above description, in one or more embodiments the method here described provides a navigation information including position information, e.g., position P, including altitude information by a dead reckoning navigation sensing device, the sensor 10, which includes:
- an absolute positioning source, in particular the GNSS receiver (13), providing absolute position data (SD), e.g., the satellite position data, including an absolute altitude value $h_{GNSS}$,
- an Inertial Measuring Unit (11) providing motion data IMD, in particular a six axis IMU providing angular rates and acceleration over three Cartesian axes,
- a barometer sensor (12), in particular a digital barometer sensor, providing a pressure measurement p, the method including processing, in the 2D module 1431 of processor 14, by a data fusion process, the motion data IMD and the absolute position data SD, in particular GNSS measure latitude and longitude, to obtain two-dimensional position information, in particular longitude $\lambda$ and latitude $\phi$, processing, in the 3D module 1432 of processor 14, by a data fusion process, the pressure measurement p and the absolute position data SD, specifically the absolute altitude, which is in the example the GNSS measured altitude, to obtain an altitude estimate h, which is in particular the combined with the two-dimensional position information to form the position information outputted by the sensor 10.

The solution disclosed provides specifically that such processing the pressure measurement p and the absolute position data SD to obtain an altitude estimate h, includes performing a recursive estimation operation 200, in particular a Kalman filtering or Extended Kalman Filtering, to obtain the altitude estimate h including recursively estimating a state vector x including state variables, i.e., [h $h_o$ k], representing calibration parameters, the recursive estimation operation 200 comprising at each iteration performing a system update operation 220 including updating a state transition model, using as external input u the pressure measurement p or $p_t$ measured by the barometer 12 and a current estimate of such calibration parameters [h $h_0$ k]. The estimated altitude $\hat{h}_t$ at a given iteration may be calculated on the basis of the difference input pressure observation $p_t$ at that iteration and the pressure initialization value, modulated by the sensitivity k at that iteration, and summed to the pressure referenced altitude $h_0$ value at that iteration, to which is added the error $v_h$ on estimated altitude caused by the model equation itself. As shown, two equations for the other calibration parameters $h_0$, k may be included in the transition model.

Then the method provides checking, in block 230 if an absolute altitude $h_{GNSS}$ measurement is available from the absolute positioning source 13 and in the affirmative performing a measurement update operation, in block 250. In the negative the method may provide using the altitude estimate h provided by the system update operation 220. The measurement update operation is performed using as input observation y the absolute altitude $h_{GNSS}$, first performing calculation, in block 240 of a difference dy between the altitude estimate h provided by the system update operation 220 and the absolute altitude $h_{GNSS}$, then performing the measurement update operation updating the altitude estimate in the system update operation 220 as a function of the difference dy and feeding back to the system update operation 220 such difference dy to correct the altitude estimate (h) in the system update operation 220 and the calibration parameters h $h_0$ k.

Also, on the basis of the above description, in one or more embodiments, a navigation system configured to provide a navigation information, e.g., position P, velocity V, altitude A, in particular in a land vehicle, including position information P including altitude information h by a dead reckoning navigation sensing device 10, may include including:
- an absolute positioning source, in particular the GNSS receiver (13), providing absolute position data (SD), e.g., the satellite position data, including an absolute altitude value $h_{GNSS}$,
- an Inertial Measuring Unit 11 providing motion data IMD, in particular a six axis IMU providing angular rates and acceleration over three Cartesian axes,
- a barometer sensor 12, in particular a digital barometer sensor, providing a pressure measurement p,
- a processor module 14 configured to perform the method according to the embodiments above described, in particular receiving the outputs of the above sensors 11, 12, 13.

The processor module 14 includes a module 143 configured for performing data fusion, in particular using Kalman filters, comprising a module 1431 to process the motion data IMD and the position data SD to obtain two-dimensional position information, in particular longitude and latitude, in particular using the inertial data for performing a dead reckoning of the 2D position, and a module 1432 configure to process the pressure information p and the position data including an absolute altitude $h_{GNSS}$ to obtain the altitude information h. The processor module 14 preferably includes a nonvolatile memory configured to store the state variables values in correspondence of a given event.

Thus the method and system described allows fusing GNSS and barometer measurements, with an easy implementation in embedded software due to its low computational complexity.

The method has several further advantages:
- first of all, it allows to calibrate the barometer automatically without the need of specific actions in production line, whose cost is often relevant for BOMs (Bill of Materials).
- it does not need specific configuration actions from the user side, hence it transparent and user friendly;
- it provides seamless fusion between GNSS and barometer, with the result to guarantee 100% altitude availability and integrity, even when GNSS is not available or jeopardized by reflections or interferences;
- although the system needs an initial calibration step to be effective, saving estimates to memory, it is possible to overcome also limitation.

Without prejudice to the underlying principles, the details and embodiments may vary, even significantly, with respect to what has been disclosed by way of example only, without departing from the extent of protection.

The extent of protection is defined by the annexed claims.

The fusion method hereby described is not depending on specific constraints imposed by the automotive user case. That is, the same approach can be exported to any device mounting a barometer and an absolute positioning source, or absolute altitude reference provider. For example, the method here described can be implemented into a smartphone, or into a fitness device such like the ones used by bikers and trekkers. The approach can be also extended to aircraft user cases, although due to the faster dynamics for atmospheric parameters the modeling of barometer calibration may be adapted, either by increasing the process noise or introducing a more accurate prediction model.

Also, the processing, by a data fusion process, the pressure measurement and the absolute position data to obtain an altitude estimate, may use absolute positioning sources different with respect to the GNSS receiver. In variant embodiments, an alternative absolute positioning source may be used, for example a 3D map database (either local or remote) may be used as absolute positioning source providing the altitude information. The operations for performing the data fusion remain substantially the same, and the measurement noise is used to modulate observation influence on filter output depending on the specific error characteristics of the alternative absolute positioning source.

What is claimed is:

1. A method for providing navigation information by a navigation sensing device, the method comprising:
   collecting, by an inertial measurement unit of the navigation sensing device, motion data comprising acceleration and angular rates;
   collecting, by an absolute positioning source of the navigation sensing device, three-dimensional absolute position data comprising absolute altitude;
   collecting, by a barometer sensor, pressure measurement;
   processing, by a first data fusion process, the motion data and the three-dimensional absolute position data to obtain two-dimensional position information;
   processing, by a second data fusion process, the pressure measurement and the absolute position data to obtain an altitude estimate, the processing, by the second data fusion process, including:
   performing a recursive estimation operation to obtain the altitude estimate, including recursively estimating a state vector including state variables representing calibration parameters, the recursive estimation operation comprising at each iteration performing a system update operation including updating a state transition model estimating the altitude estimate using the pressure measurement and a current estimate of the calibration parameters; and
   performing a measurement update operation using the absolute altitude, the measurement update operation comprising:
   calculating a difference between the altitude estimate and the absolute altitude;
   updating the altitude estimate for the system update operation as a function of the difference; and
   feeding back to the system update operation the difference to correct the calibration parameters and the altitude estimate in the system update operation; and
   providing navigation information by the navigation sensing device based on the measurement update operation,
   wherein a state transition matrix of the state transition model is obtained by performing partial differentials of the state vector versus each of the state variables and a system noise matrix as a diagonal matrix having on a diagonal, standard deviation of errors in system update equations of the state transition model.

2. The method of claim 1, wherein the recursive estimation operation includes Kalman filtering.

3. The method of claim 2, wherein the recursive estimation operation includes an Extended Kalman Filter.

4. The method of claim 3, comprising providing initialization values to the system update operation, including an estimated altitude initialization value, a pressure- referenced altitude initialization value, a pressure initialization value representing a pressure at which the pressure-referenced altitude is referenced, and a sensitivity initialization value.

5. The method of claim 2, further comprising feeding back to the system update operation the difference to correct the altitude estimate in the system update operation and the calibration parameters after waiting for a next pressure measurement, and then executing a next iteration of the filtering in the recursive estimation operation.

6. The method of claim 1, wherein:
   the state variables representing the calibration parameters include:
   a pressure-referenced altitude corresponding to a certain fixed atmospheric pressure value measured by the barometer sensor;
   a sensitivity estimate, representing a coefficient converting pressure to altitude; and
   output altitude information; and
   the state transition model includes:
   a first system update equation calculating the sensitivity estimate as a previous sensitivity estimate at a previous iteration plus an error on the sensitivity estimate introduced by the first system update equation;

a second system update equation calculating the pressure-referenced altitude as a previous pressure-referenced altitude estimate at the previous iteration plus an error on a pressure-referenced altitude estimate introduced by the second system update equation; and a third system update equation calculating the altitude estimate as the pressure- referenced estimated altitude summed to a difference between the pressure measurement and an initialization pressure multiplied by the sensitivity estimate plus an error on the altitude estimate introduced by the third system update equation.

7. The method of claim 6, where the first system update equation is corrected as a function of pressure and altitude.

8. The method of claim 1, comprising storing the state variables corresponding to a given event, and loading the stored state variables as initialization values corresponding to a new event following the given event.

9. The method of claim 1, wherein the absolute positioning source is a global navigation satellite system receiver.

10. The method of claim 1, wherein the two-dimensional position information is longitude and latitude.

11. A navigation system configured to provide navigation information, the navigation system comprising:
an absolute positioning source providing three-dimensional absolute position data including an absolute altitude;
an inertial measurement unit providing motion data including accelerations and angular rates;
a barometer sensor providing a pressure measurement; and
a processor module configured to:
process, in a first data fusion process, the motion data and the absolute position data to obtain two-dimensional position information;
process, in a second data fusion process, the pressure measurement and the absolute position data to obtain an altitude estimate, wherein the second data fusion process includes:
performing a recursive estimation operation to obtain the altitude estimate, including recursively estimating a state vector including state variables representing calibration parameters, the recursive estimation operation comprising at each iteration performing a system update operation including updating a state transition model estimating the altitude estimate using the pressure measurement and a current estimate of the calibration parameters; and
performing a measurement update operation using the absolute altitude, the measurement update operation comprising:
calculating a difference between the altitude estimate and the absolute altitude;
updating the altitude estimate for the system update operation as a function of the difference; and
feeding back to the system update operation the difference to correct the calibration parameters and the altitude estimate in the system update operation; and
provide navigation information by the navigation sensing device based on the measurement update operation,
wherein a state transition matrix of the state transition model is obtained by performing partial differentials of the state vector versus each of the state variables and a system noise matrix as a diagonal matrix having on a diagonal, standard deviation of errors in system update equations of the state transition model.

12. The navigation system of claim 11, wherein the processor module comprises a nonvolatile memory configured to store the state variables corresponding to a given event.

13. The navigation system of claim 11, wherein the absolute positioning source is a global positioning satellite system receiver.

14. The navigation system of claim 11, wherein the navigation system is mounted on a land vehicle.

15. The navigation system of claim 11, wherein:
the state variables representing the calibration parameters include:
a pressure-referenced altitude corresponding to a certain fixed atmospheric pressure value measured by the barometer sensor;
a sensitivity estimate, representing a coefficient converting pressure to altitude; and
output altitude information; and
the state transition model includes:
a first system update equation calculating the sensitivity estimate as a previous sensitivity estimate at a previous iteration plus an error on the sensitivity estimate introduced by the first system update equation;
a second system update equation calculating the pressure-referenced altitude as a previous pressure-referenced altitude estimate at the previous iteration plus an error on a pressure-referenced altitude estimate introduced by the second system update equation; and
a third system update equation calculating the altitude estimate as the pressure- referenced estimated altitude summed to a difference between the pressure measurement and an initialization pressure multiplied by the sensitivity estimate plus an error on the altitude estimate introduced by the third system update equation.

16. A non-transitory computer-readable media storing computer instructions that when executed by at least one processing circuit, cause the at least one processing circuit:
collect, by an inertial measurement unit of a navigation sensing device, motion data comprising acceleration and angular rates,
collect, by an absolute positioning source of the navigation sensing device, three-dimensional absolute position data comprising absolute altitude,
collect, by a barometer sensor, pressure measurement,
process, in a first data fusion process, the motion data and the three-dimensional absolute position data to obtain two-dimensional position information;

process, in a second data fusion process, the pressure measurement and the absolute position data to obtain an altitude estimate, the second data fusion process including:
  performing a recursive estimation operation to obtain the altitude estimate, including recursively estimating a state vector including state variables representing calibration parameters, the recursive estimation operation comprising at each iteration performing a system update operation including updating a state transition model estimating the altitude estimate using the pressure measurement and a current estimate of the calibration parameters; and
  performing a measurement update operation using the absolute altitude, the measurement update operation comprising:
    calculating a difference between the altitude estimate and the absolute altitude;
    updating the altitude estimate for the system update operation as a function of the difference; and
    feeding back to the system update operation the difference to correct the calibration parameters and the altitude estimate in the system update operation; and
  provide navigation information by the navigation sensing device based on the measurement update operation,
  wherein a state transition matrix of the state transition model is obtained by performing partial differentials of the state vector versus each of the state variables and a system noise matrix as a diagonal matrix having on a diagonal, standard deviation of errors in system update equations of the state transition model.

17. The non-transitory computer-readable media of claim 16, wherein:
  the state variables representing the calibration parameters include:
    a pressure-referenced altitude corresponding to a certain fixed atmospheric pressure value measured by the barometer sensor;
    a sensitivity estimate, representing a coefficient converting pressure to altitude; and
    output altitude information; and
  the state transition model includes:
    a first system update equation calculating the sensitivity estimate as a previous sensitivity estimate at a previous iteration plus an error on the sensitivity estimate introduced by the first system update equation;
    a second system update equation calculating the pressure-referenced altitude as a previous pressure-referenced altitude estimate at the previous iteration plus an error on a pressure-referenced altitude estimate introduced by the second system update equation; and
    a third system update equation calculating the altitude estimate as the pressure- referenced estimated altitude summed to a difference between the pressure measurement and an initialization pressure multiplied by the sensitivity estimate plus an error on the altitude estimate introduced by the third system update equation.

18. The non-transitory computer-readable media of claim 17, where the first system update equation is corrected as a function of pressure and altitude.

19. The non-transitory computer-readable media of claim 16, wherein the recursive estimation operation includes Kalman filtering or an Extended Kalman Filter.

20. The non-transitory computer-readable media of claim 16, wherein the computer instructions, when executed by the at least one processing circuit, cause at least one processing circuit to feed back to the system update operation the difference to correct the altitude estimate in the system update operation and the calibration parameters after waiting for a next pressure measurement, and then executing a next iteration of the filtering in the recursive estimation operation.

* * * * *